No. 703,929. Patented July 1, 1902.
F. E. IVES.
PHOTOCHROMOSCOPIC AND TRICHROMATIC APPARATUS.
(Application filed May 21, 1902.)
(No Model.)

Witnesses:—
Chas. W. Cox.
Herman E. Metius.

Inventor:—
Frederic E. Ives,
by his Attorneys;
Howson & Howson

UNITED STATES PATENT OFFICE.

FREDERIC E. IVES, OF PHILADELPHIA, PENNSYLVANIA.

PHOTOCHROMOSCOPIC AND TRICHROMATIC APPARATUS.

SPECIFICATION forming part of Letters Patent No. 703,929, dated July 1, 1902.

Application filed May 21, 1902. Serial No. 108,384. (No model.)

*To all whom it may concern:*

Be it known that I, FREDERIC E. IVES, a citizen of the United States, residing in Philadelphia, Pennsylvania, have invented certain Improvements in Photochromoscopic and Trichromatic Apparatus, of which the following is a specification.

The object of my invention is to provide an improved substitute for the transparent reflectors of clear or colored or thinly-silvered or platinized plates of glass which are employed in various forms of photochromoscopic or trichromatic apparatus for dividing the light into three or more portions in order to form three or more images with light coming from one view-point or to optically superpose three or more images to the eye. This object I attain in the manner hereinafter set forth, reference being had to the accompanying drawings, in which—

Figure 1:
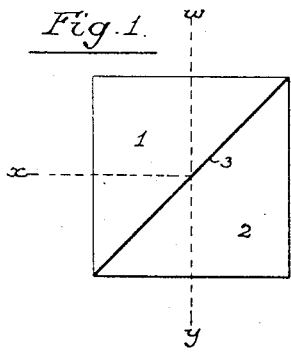
Figure 2:
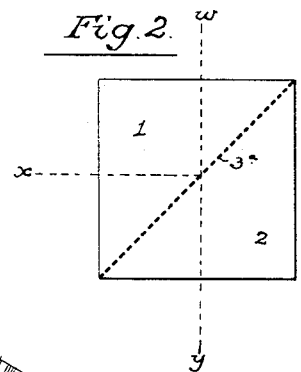
Figures 3, 4, 5:
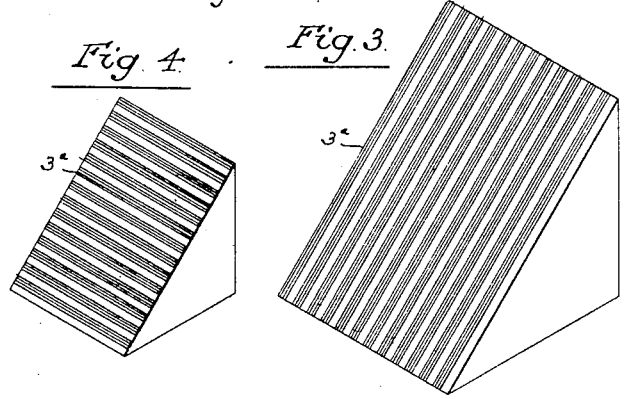

Figures 1 and 2 are views showing light reflecting and transmitting devices constructed in accordance with my present invention. Figs. 3, 4, and 5 are perspective views of an element of a compound prism constituting one of the features of my invention, and Fig. 6 is a diagrammatic view of a trichromatic camera in which one of said compound prisms is employed.

Clear or colored transparent-glass reflectors, although efficient when properly used in photochromoscopic or trichromatic apparatus, have certain defects which it is advisable to eliminate. When clear glasses are used, it is necessary to provide combinations which will parallelize the rays of light which form the two reflections in order to avoid doubling of outlines, and colored-glass reflectors do not reflect as much light as is sometimes desirable to equalize the illumination of the different colors. Moreover, both clear and colored glasses have polarizing properties which may introduce errors in the performance of the apparatus, and the inclination of glass plates in a cone of rays introduces an image distortion which cannot be perfectly corrected without further elaboration of optical parts, involving some loss of light. Thinly-silvered mirrors are also very easily injured and rendered useless. In order to avoid these defects, I substitute for a plate-glass reflector a compound prism, preferably two rectangular prisms cemented together, with one of the internal surfaces thinly silvered, or, if provided with an opaque metallic reflecting-film, having the latter broken by lines or equivalent openings in the film, which are sufficiently open to avoid the introduction of destructive diffraction effects. In the accompanying drawings such compound prisms are represented in Figs. 1 and 2, in each of which figures two rectangular prisms are represented, respectively at 1 and 2, these prisms having their diagonal faces cemented together, such face of either prism being provided with a thin coating or deposit of silver or other metal, as shown at 3 in Fig. 1, or, if provided with an opaque metallic coating or film $3^a$, having the same broken by openings—such as lines, dashes, dots, or the like—distributed throughout the area of the film, the prisms shown in Figs. 2, 3, 4, and 5 having the metallic film broken by parallel lines about equaling in width the intervening portions of the film. Such a reflecting and transmitting device, if employed in proper relation to a lens of sufficient aperture, will not interfere with the formation of a complete image by both the reflected and transmitted rays. Either of the devices shown in Figs. 1 and 2 overcomes the objections noted as attending the use of inclined plate-reflectors, the direction of the incident rays being represented at $w$, of the reflected rays at $x$, and of the transmitted rays at $y$.

Figure 6:
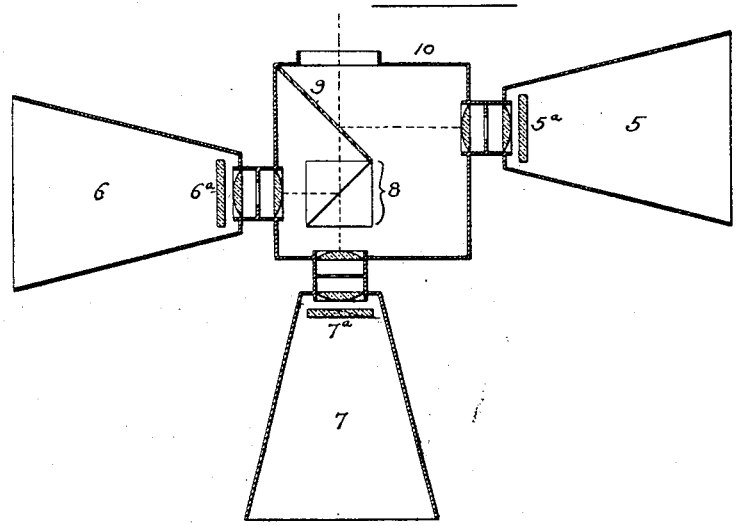

Fig. 6 shows a simple form of trichromatic camera in which a light reflecting and transmitting device such as shown in Fig. 1 is utilized for dividing the rays of light which go to form the red and green images, a plate-glass reflector serving to reflect the rays which form the blue image and transmit the rays which form the red and green images. In this case 5, 6, and 7 represent ordinary photographic cameras, $5^a$, $6^a$, and $7^a$, respectively, the blue, green, and red color screens employed in connection therewith, 8 the compound prism, and 9 a yellow-glass reflector for separating the rays which are to form the blue image from those which are to form the red and green images. A compound prism can be substituted for the reflector 9, but the greater sensitiveness of a photographic plate to the blue rays makes the plate-glass reflector efficient, whereas a reflector of this character occupying the position of the reflecting-surface of the compoundprism 8 might not reflect sufficient light to approximately equalize the working apertures of the lenses belonging to the cameras 6 and 7, as is desirable in order to give the greatest possible effective light-intensity for the whole combination.

The transparent-reflector system may be contained within a box-like inclosure 10, with aperture at the front for the passage of the incident rays.

When two of the compound prisms are used each having a lined opaque reflecting-surface, the lines of one prism should be at an angle, preferably a right angle, in respect to those of the other.

A compound prism such as I have shown and described might be substituted for one or more of the transparent glass mirrors in any of the various forms of photochromoscopic apparatus shown in my prior patents and in which plates of glass are employed as such transparent mirrors.

Having thus described my invention, I claim and desire to secure by Letters Patent—

1. In apparatus of the character described, a compound prism with internal light reflecting and transmitting surface as a means of dividing the rays of light which form two colored images.

2. In apparatus of the character described, a compound prism with internal light reflecting and transmitting surface as a means of dividing the rays of light to form two images, in combination with appropriate color screens for said divided rays.

3. In apparatus of the character described, the combination of a compound prism with internal light reflecting and transmitting surface for dividing the rays which form two images, and a plate-reflector for separating from the incident rays those which form a third image.

4. A light reflecting and transmitting device consisting of a prism having its inclined face provided with an opaque film, having breaks or openings therein distributed throughout the area of the film.

5. A light reflecting and transmitting device consisting of a compound prism formed of two prisms with their diagonal faces secured together, one of such faces having an opaque film with breaks or openings therein distributed throughout the area of the film.

In testimony whereof I have signed my name to this specification in the presence of two subscribing witnesses.

FREDERIC E. IVES.

Witnesses:
F. E. BECHTOLD,
JOS. H. KLEIN.